April 4, 1950
E. R. CAPEWELL
2,502,701
TUBE CUTTER
Filed May 13, 1946
Fig. 1.
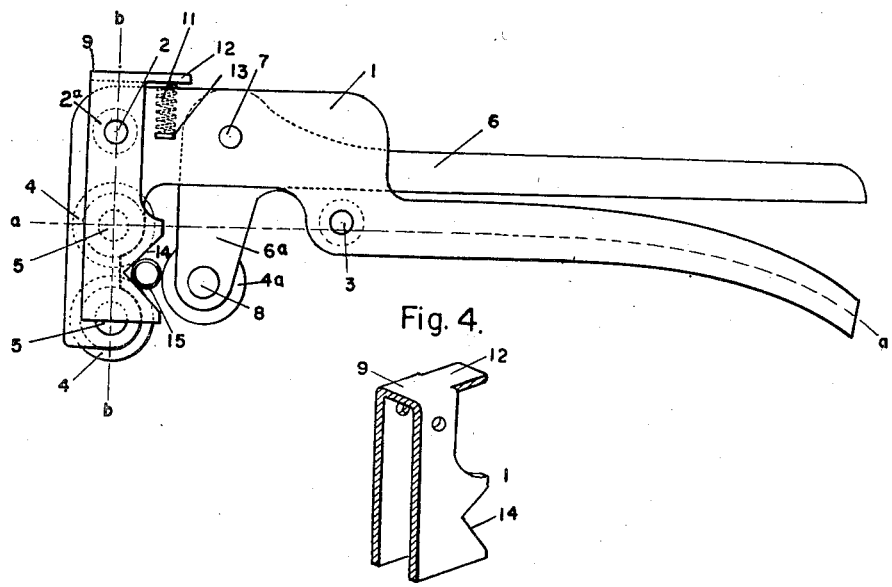
Fig. 4.
Fig. 2.
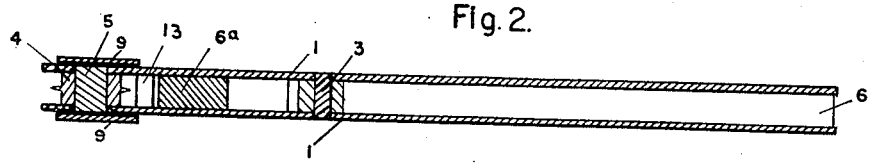
Fig. 3.
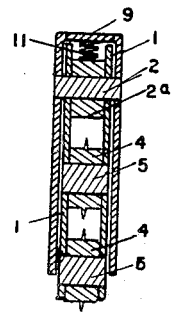
INVENTOR
Eugene R. Capewell
BY
ATTORNEY Patented Apr. 4, 1950

2,502,701

UNITED STATES PATENT OFFICE 2,502,701

TUBE CUTTER

Eugene R. Capewell, Moorestown, N. J.

Application May 13, 1946, Serial No. 669,398

1 Claim. (Cl. 30—102)

This invention relates to tools adapted to cutting copper and brass tubing such as is used in refrigeration, hydraulic and automotive apparatus.

The object of this invention is to provide a tube cutting tool that embodies a simple means to maintain the movable cutting member in absolute alignment with the fixed cutting members during operative use.

Another object of the invention is to provide a yielding tube aligning member that places the tube to be cut at a ninety degree angle to the cutting members to automatically square the end of the tube properly for flaring or sweating.

Another object of this invention is to provide an automatically self-aligning tube cutting means adapted to single handed operation whereby cutting pressure may be regulated during oscillation of the tool to provide a substantially burless and undistorted tube end.

These and other objects and advantages will be apparent from the specification and drawings as is hereinafter fully disclosed.

In the accompanying drawings,

Figure 1 shows a side elevation of the invention, and

Figure 2 is a sectional plan view taken on line a—a in Figure 1, and

Fig. 3 is a sectional elevation taken on line b—b in Figure 1, and

Fig. 4 is a perspective view of the tube aligning member.

Reference characters indicate the same parts in the several drawings.

In the practice of the invention as hereinafter exemplified, the body portion or housing 1 may be made from metal stampings as shown, or from forgings or castings suitably machined. The stampings shown provide complementary sections which comprise the housing for the fixed and movable cutting elements, and spacing members 2a and 3 are provided to hold the housing member 1 in a rigid and equally spaced relation to each other.

Tool steel tube cutting wheel members 4 are centrally disposed between the complementary housing members 1, and are rotatably disposed on pins or shafts 5, said shafts being rigidly secured by suitable means in the housing members 1.

A tube cutting wheel carrying lever 6 is interposed between the housing sections 1 and pivotally disposed therein in such manner as to provide engagement of the opposite plane surfaces of the cam lever with the housing members 1, thereby holding said cam lever in absolute alignment. The aforementioned lever is secured in the housing 1 by means of a pin or shaft 7 upon which it oscillates.

A tube cutting wheel member 4a is rotatably disposed in a slot provided in the cam end 6a of the cam lever member 6 (slot not shown) and is rotatably mounted therein on a pin or shaft 8 which is properly secured by riveting or other suitable means to prevent wobble or sidewise movement.

A U-shaped tube aligning member or guide 9 is disposed on a pin or shaft 2 passing through the spacing member 2a upon which it oscillates. While spacing members are usually screw machine parts turned in a single piece, the present invention provides a hole through the spacer so that the guide member 9 may be mounted upon the device and the pin 2 placed therethrough to secure said guide in operative position.

A spring 11 is interposed between the leg 12 of the tube guide 9 and a seat 13 disposed between the housing members 1 to hold the guide member 9 forward toward the cutting wheel 4a. V-shaped tube guiding openings 14 are provided in the guide member 9 and are so disposed that when a tube 15 is placed in position to be cut it is automatically aligned at a right angle to the cutting edges of the cutting members 4 without touching said members. Applying pressure to the lever 6 forces the cutting wheel 4a against the tube 15 which in turn presses the guide member 9 toward the rear thereby permitting said tube to be engaged by the fixed tube cutting wheels 4. The tube guide 9 maintains constant aligning pressure against the tube during the oscillating motion applied to the tool until the tube is severed.

A gradual controlled pressure may be applied during the cutting operation to produce a minimum of distortion and burr. Springs such as are conventionally provided for holding shear members in open position may be used in this device, however, as they are well known in the arts they have not been shown or described.

What is claimed as the invention and desired to be secured by Letters Patent, is:

A tube cutting tool comprising a housing, a pair of fixed cutter wheels mounted therein, a hand grip portion extending from the housing, a movable handle lever pivoted in said housing and extending therefrom proximate said hand grip portion, a cutter wheel carried by the inner end of said lever in alignment with the fixed cutter wheels for movement toward and away from the fixed wheels in accordance with oscillation of said lever, a work positioning member having a pair of spaced parallel legs with an intervening integral foot portion extending laterally therefrom, said work positioning member straddling the fixed cutter wheel carrying portion of the housing with the legs of the member overlying the fixed cutter wheels in face engagement with the sides of the housing, a pin disposed transversely through the legs of the work positioning member and the housing and providing a pivot for oscillation of the positioning member, the inner side edges of the legs of the work positioning member having transversely registered V-shaped work seating sockets, and expansion spring means between the housing and the foot extension of said work positioning member biasing the legs thereof inwardly with their sockets spaced inwardly away from the peripheries of the fixed cutter wheels.

EUGENE R. CAPEWELL.

REFERENCES CITED

The following references are of record in the file of this patent:

UNITED STATES PATENTS

| Number | Name | Date |
|---|---|---|
| 1,505,205 | Kilgour | Aug. 19, 1924 |
| 1,674,440 | McCloskey | June 19, 1928 |
| 2,284,133 | Condon | May 26, 1942 |
| 2,325,353 | Wright | July 27, 1943 |